United States Patent [19]
Dirr

[11] Patent Number: 5,581,368
[45] Date of Patent: Dec. 3, 1996

[54] DATA-REDUCING CODING METHOD FOR TRANSMITTING INFORMATION FROM A TRANSMITTER TO A RECEIVER

[76] Inventor: Josef Dirr, Neufahrner Strasse 5, D-81679 Munich, Germany

[21] Appl. No.: 487,160

[22] Filed: Jun. 7, 1995

Related U.S. Application Data

[62] Division of Ser. No. 108,594, filed as PCT/EP92/02977, Dec. 23, 1992.

[30]   Foreign Application Priority Data

Feb. 24, 1992 [DE]   Germany .......................... 42 05 570.9
Nov. 6, 1992 [DE]   Germany .......................... 42 37 596.7

[51]  Int. Cl.$^6$ .............................. H04N 1/41; H04N 1/415
[52]  U.S. Cl. .................. 358/426; 358/261.1; 358/261.3; 382/245
[58]  Field of Search ................................ 358/429, 261.1, 358/261.3, 433, 432, 455, 539, 530, 521, 426; 382/245

[56]              References Cited

U.S. PATENT DOCUMENTS

| Re. 32,291 | 11/1986 | Nakagome et al. ................. 358/261.3 |
| 2,907,830 | 10/1959 | Boutry et al. . |
| 4,121,259 | 10/1978 | Preuss et al. .......................... 358/261.1 |
| 4,366,506 | 12/1982 | Ejiri et al. ................................ 358/429 |
| 4,409,623 | 10/1983 | Kobayashi et al. .................. 358/261.1 |
| 4,675,721 | 6/1987 | Dirr . |
| 4,839,738 | 6/1989 | Kaku et al. .......................... 358/261.2 |

FOREIGN PATENT DOCUMENTS

| 0329158 | 8/1989 | European Pat. Off. ......... H04L 25/48 |
| 2552751 | 11/1977 | Germany .......................... H04N 1/00 |
| 2946982 | 5/1980 | Germany .......................... H04N 1/411 |
| 3247334 | 7/1983 | Germany .......................... H04N 1/41 |
| 3223312 | 12/1983 | Germany .......................... H04N 9/02 |
| 3226382 | 2/1984 | Germany .......................... H04N 9/02 |
| 3330845 | 3/1984 | Germany .......................... H04N 1/41 |
| 3709451 | 10/1988 | Germany .......................... H04N 11/08 |
| 3909074 | 9/1990 | Germany .......................... H03M 5/00 |
| 4025026 | 6/1991 | Germany .......................... H04L 5/00 |
| 4111872 | 11/1991 | Germany .......................... H04N 1/415 |
| WO90/04895 | 5/1990 | WIPO .......................... H04L 25/48 |
| WO91/17646 | 11/1991 | WIPO ............................ H04N 1/41 |

OTHER PUBLICATIONS

I.E.E.E. Transactions on Consumer Electronics, 1988 International Conference on Consumer Electronics Part 1, vol. 34, No. 3 (Aug. 1988), NY, NY, pp. 759–767, "Standard Subscriber Line Compatible Color Videophone", Suzuki et al.

Signal Processing Image Communication, vol. 1, No. 1 (Jun. 1989), Amsterdam, Netherlands, pp. 55–73, "Standardization Activities in Image Communications for Telematic Services", Yamazaki.

Conference Record of the National Telesystems Conference, Galveston, Texas, Nov. 7–10, 1982, p. E1.5.1, "Run–Length Encoding of Tri–State Video Delta Modulation", UDALOV et al.

Journal of the Society of Motion Picture and Television Engineers, vol. 82, No. 8 (Aug. 1973), pp. 649–654, "PCM Encoded NTSC Color Television Subjective Tests", Goldberg.

Primary Examiner—Scott A. Rogers
Attorney, Agent, or Firm—Nields & Lemack

[57]               ABSTRACT

A coding of images and originals, for example, for telefax and color television, allows transmission time to be shortened, in particular in the case of black and white digital or numeric longitudinal coding. For that purpose, the same code words for black and white are provided also for different numbers or digits. As discriminating criterion, the input sequence of black and white is used. During coding of several successive white lines, transmission time can be further shortened in that the coded number of white lines is provided before or after the code word for the white line. During gray coding, transmission time is in particular reduced by subdividing the gray scales or binary code words, if necessary with deliberate redundancy, since in this case many characters occur successively and are then transmitted in the same way as the white lines. During color image transmission, transmission time is further reduced by code multiplexing and if necessary by QAM-based transmission, whereas in addition the PAM-coded information is D.C. biased. The sum alternating current thus varies in phases in the range of 90 degrees only.

7 Claims, 7 Drawing Sheets

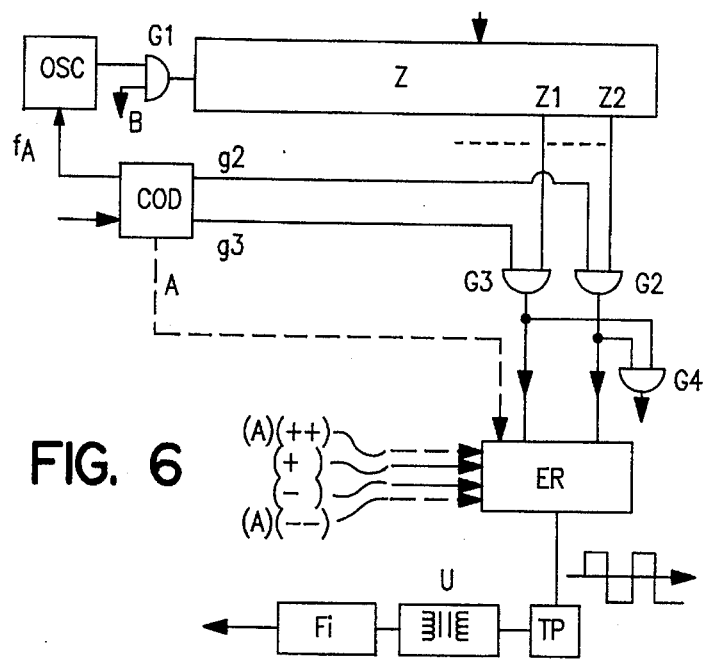
FIG. 6
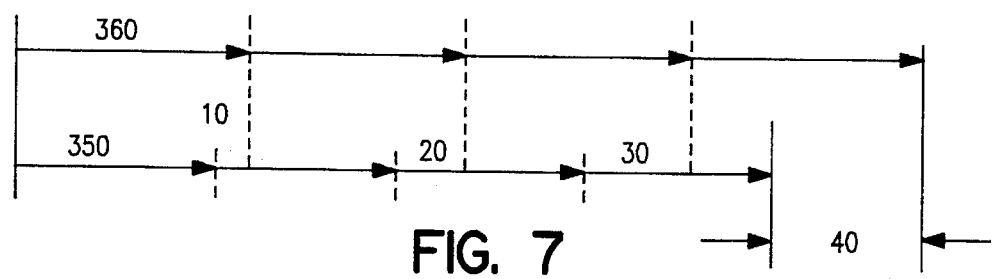
FIG. 7
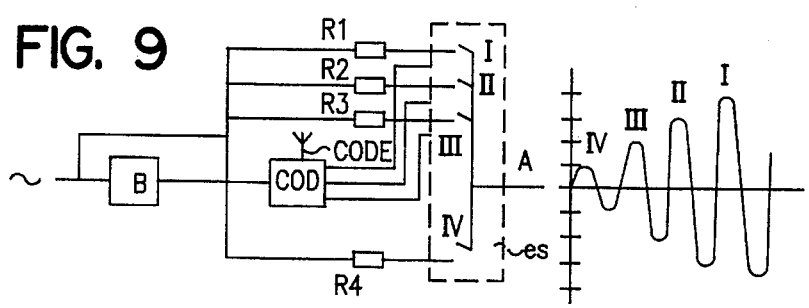
FIG. 9
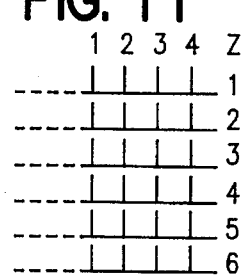
FIG. 10
FIG. 11
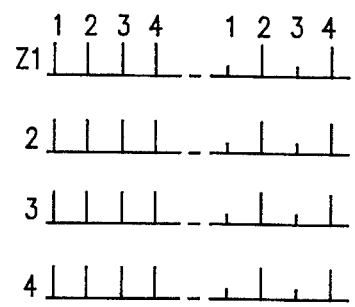
FIG. 12

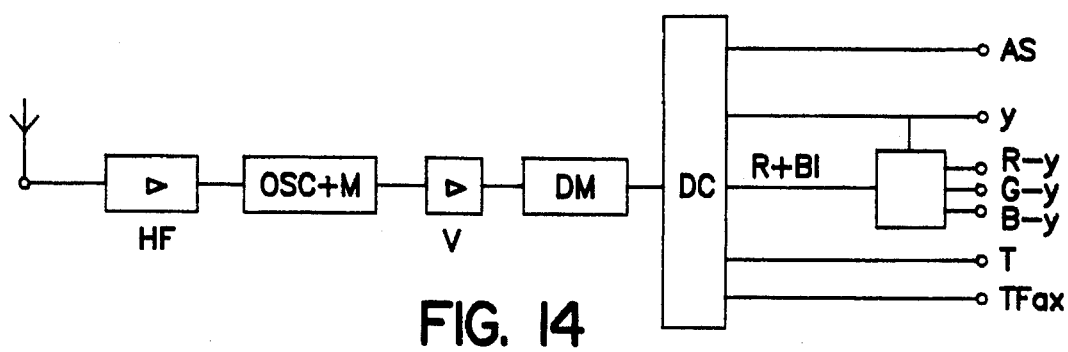
FIG. 14
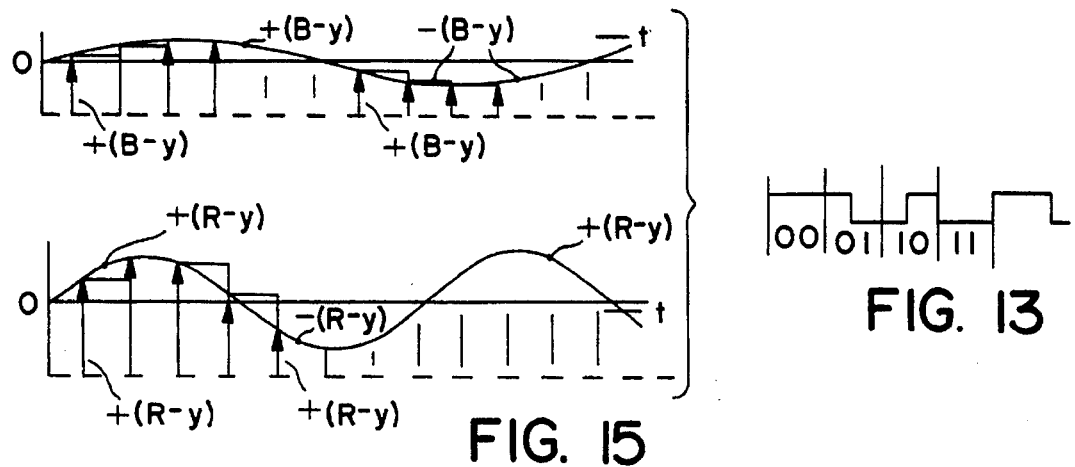
FIG. 15
FIG. 13
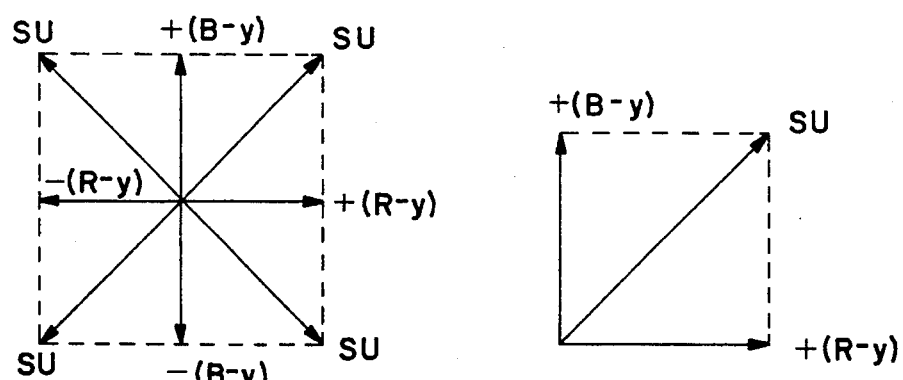
FIG. 16
FIG. 17
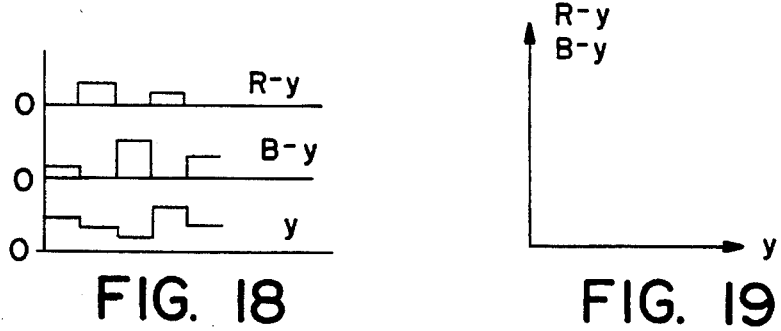
FIG. 18
FIG. 19

DATA-REDUCING CODING METHOD FOR TRANSMITTING INFORMATION FROM A TRANSMITTER TO A RECEIVER

CROSS-REFERENCE TO RELATED APPLICATION

This application is a division of application Ser. No. 08/108,594, filed on Sep. 3, 1993, which is the U.S. National Phase Application of PCT/EP92/02977, filed on Dec. 23, 1992.

TECHNICAL FIELD

The present invention is concerned with the coding and transmission of images and patterns, in particular for telefax and for television, especially color television.

STATE OF THE ART

Facsimile equipment is split into standard groups in accordance with the transmission time. Groups 1 and 2 with point by point scanning have already been superseded by Group 3 equipment. The latter represents a digital transmission system in which the picture scanning points of equal brightness are brought together in an unbroken sequence and combined into a code word. Such methods are known as one-dimensional. The MHC method is such a one. The two-dimensional process is built up on the same principle. In this first a reference line is scanned and in the subsequent lines only any departure from the reference line is coded. The MRC method operates in accordance with this principle. Then there is the MMR code, in which after a coded reference line a large number of subsequent lines are coded two-dimensionally. In the run-length coding, for each number of picture points per line, a special binary code is determined for white and black, eg. 1 white=000111, 1 black=010, 2 white=0111, 2 black=11, . . . 20 white=0001000, 20 black=00001101000. Such coding goes up to picture point number 63. Then one starts again from the beginning with an additional section code word for white and black. For transmitting these coded numbers in particular, the phase-difference or amplitude-phase-difference modulation is employed.

In gray-scale scanning the gray values were divided into gray steps and converted in more or less close patterns of black and white dots. In this way, as is known from the Dither printing process, a corresponding gray step is taken in by the eye. In the coding of color images and patterns expensive processes have hitherto been necessary. To some extent similar to the coding in the NTSC, PAL and SECAM systems.

DESCRIPTION OF THE INVENTION

A drawback of these known methods is in facsimile the relatively long time taken up for transmission and the large outlay for coding and the necessary large bandwidth, in particular in the coding and transmission of color images. As hitherto several carriers were required in color transmission, distortion by mutual interference, such as for example cross color, cross luminance, have arisen.

The aim of the invention is to provide such a coding that the information can be transmitted in a shorter time period than hitherto, but with at least the same transmission security. This is attained in that the run length coding in numbers or digits for black and white takes place by means of the same code words for different numbers or digits. This is possible because the pick-up sequence black/white is used as a criterion. A further shortening of the time during the coding of white lines is therefore possible in that the respective coded number of the white lines is disposed ahead of or behind the marker for "white line". During color transmission a savings in time and effort is achieved by means of multiplex-code coding.

BRIEF DESCRIPTION OF THE DRAWINGS

FIG. 6 shows a circuit for producing cycle durations and amplitude stages.

FIG. 7 is a diagram of the addition of phase stages.

FIG. 9 shows the generation of amplitude stages.

FIG. 10 is an illustration of the binary code elements for 6 lines for code-multiplex coding.

FIGS. 11 and 12 are illustrations of operating characteristics in the combination of several lines.

FIG. 13 shows a quaternary code.

FIG. 14 shows a color television receiver for code-multiplex reception.

FIG. 15 shows oscillation curves for the color-difference signals with and without equal current bias with PAM and step signals.

FIGS. 16, 17, 18, 19, 22 coding of color-TV signals.

METHOD OF PUTTING THE INVENTION INTO PRACTICE

Figure 1:
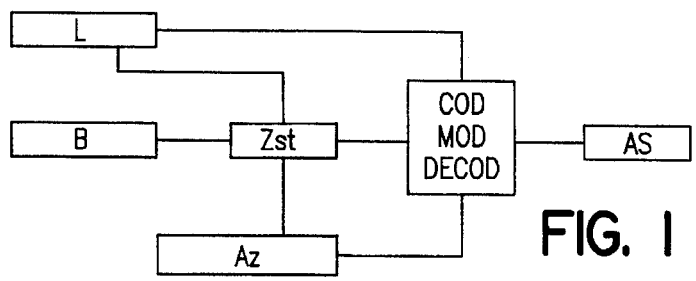
FIG. 1 is an overall representation of a facsimile equipment.

In FIG. 1 as shown a general view of a facsimile equipment. The reading unit L has the function of converting the pattern which is to be transmitted into analogue electrical signals. They are then converted into digital signals in the color Cod. The modem Mo is provided for transmission. The port unit AS serves to match to the telephone network. The incoming signals reach the decoder Decod through the port AS and are converted back to the original form in this unit. Writing onto the paper then takes place in the printer unit Az. A central control ZSt controls the telecopier system and coordinates the facsimile transmission. Control is through the operating field B.

Figure 2:
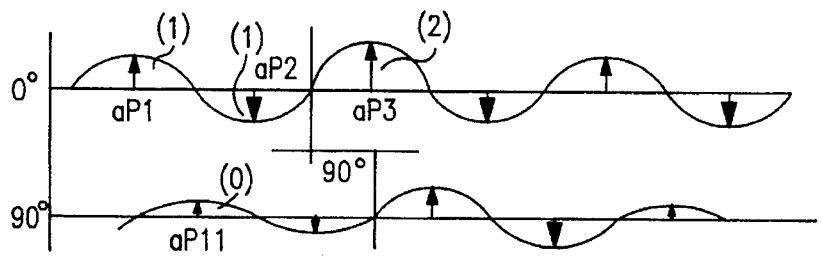
FIG. 2 shows an alternating current code in which the characteristic states are marked by the amplitudes of the half-waves. Multi-value coding is achieved by 2 alternating currents, displaced in phase by 90 degrees, and added together for transmission.
Figure 3:
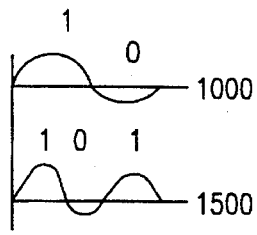
FIG. 3 shows a multi-value alternating current code in which several added alternating currents are provided, of which the frequency always lies half the frequency higher than the primary alternating current.
Figure 4:
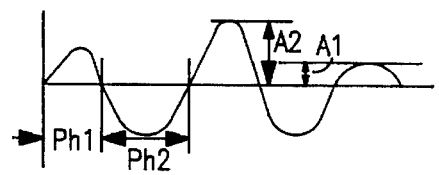
FIG. 4 shows an alternating current code in which the coding is determined by the duration of the cycles and the amplitudes of the half-waves.
Figure 5:
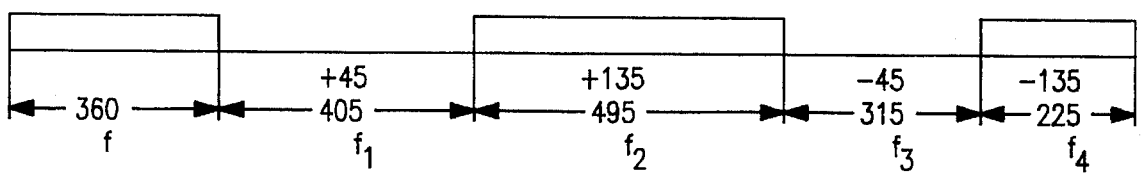
FIG. 5 shows an overall view of phase shifts by cycle durations.
Figure 8:
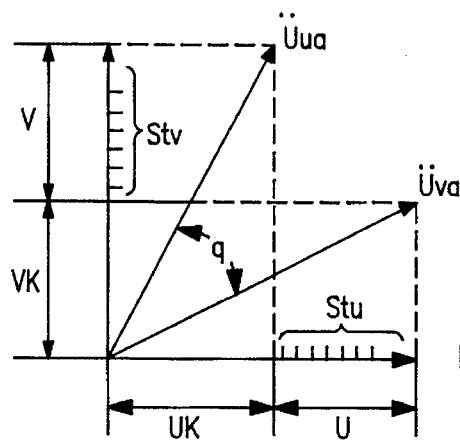
FIG. 8 is a vector diagram for illustrating jumps in phase on alteration of an amplitude in 90 degree-phase-shifted alternating currents, by addition of them.

The invention is concerned with the coding and transmission of the picture points or pixels. According to the invention a run-length coding operates in the manner in which the respective number of the white or black picture points is coded in digits or symbols. For example if 28 white pixels are scanned successively, there takes place a coding of 2 white followed by 8 white. If 6 black pixels are then scanned, the symbol 6 black is coded. A code is therefore required for the symbols 0 to 9 white and for the digits 0 to 9 black. Twenty combinations are necessary for these symbols. On the same basis naturally also the particular characteristic symbols, such as the start and stop indications (EOL) or the EOP, MCF or other criteria could be coded. For coding these 20 symbols and the criteria necessary for operation a quite simple binary or multi-value coding can be provided. In order to obtain 20 combinations 5 bits are necessary in accordance with the teleprinter alphabet No. 2. With this one can therefore code 32 combinations and criteria. Since at the most 4-digit numbers are present, if for example 1728 pixels are present per line, one can with the remaining combinations also code 2-digit numbers in the manner in which one combines the thousands which are present with the related hundreds to form a code, eg. the numbers 10, 11, 12, ... 17. For the coding of at the most 1728 pixels one then arrives at 3 codings. A distinction between white and black is not necessary in this case because the subsequent number codings reveal whether the 2-digit number belongs to white or black. If for example 1728 white pixels are coded first the number 17 and then the number 2 white and 8 white are coded. By the 2 and 8 white it is revealed that the 17 belongs to white. According to the prevailing standard every line begins with a white sequence. This standard remains unaffected by the invention. The invention can also be employed using the MRC or MMR code or a similar code both in the reference lines and also in the subsequent lines with the departures from the reference lines, in which the number or the difference number of the pixels can likewise be coded as digits or symbols. Since in the sequence or run-length method alternate numbers are always present for white and black, one can also, for economy in combinations, first code all white numbers and subsequently, in accordance with a criterion code, all black numbers with the same code. However then every run-length number must then be associated with the same number of points. One pixel must then be coded with 001, 12 pixels with 012. In black one would already emerge with 2 points. For the 3 and 4 digit exceptions a unique additional criterion would then have to be provided. For the transmission itself, as also hitherto, the phase-difference of amplitude-phase-difference modulation can be employed. Further codings are explained in the following. In FIG. 2 there is illustrated a duo-binary half-wave code. The amplitudes of half-waves (if freedom from a DC component is necessary one will provide cycles for these) of two alternating currents of the same frequency with a 90 degree phase displacement serve as coding elements. The two are added for transmission so that in the transmission only one alternating current is present. The characterizing conditions in the example are (0)=aP11, (1)=aP1, aP2, ... (2)=aP3, .... Using this principle the bit number can be substantially increased if for example one provides an arrangement in accordance with FIG. 3. Therefore one or more coding alternating currents are provided of which the frequency or frequencies increase respectively by half the original frequency, eg. with a base frequency of 1000 Hz, to 1500 Hz. Again for the coding 2 coding alternating currents are provided of 1500 Hz, displaced in phase through 90 degrees. With 2 added coded alternating currents one would achieve 10 bits with one cycle or one and a half cycles. One can also provide an amplitude/phase code. Such a code is illustrated in FIG. 4. The phase is associated by the half-wave period duration and to the amplitudes of these half-waves are associated two characteristic conditions. With 2 phase characteristics and 2 amplitude characteristics one obtains with 2 points 4 to the power of 2 and with 4 points already 4 to the power of 4 combinations. For achieving freedom from a DC component, the positive and negative half wave is necessary for a characteristic. The number of phase characteristics is also a problem in the transmission technology field, and the running time must be taken into account. In FIG. 5, 5 phase characteristics are provided. The normal phase is f=360 units. If there is a change to 405 units and the phase displacement remains, then in the next half cycle or cycle again a conversion must be made to a half cycle or cycle duration of 360 units. A circuit by which such phase/amplitude coding could be achieved is illustrated in FIG. 6. The counter unit Z is controlled by pulses of a predetermined frequency generated in the oscillator Osc. The duration of the half cycles or cycles of the rectangular pulses to be generated is then determined by the outputs Z1, Z2, .... The control of which cycle duration or which output is to be in action is achieved by the coder Cod. If the half cycle or cycle duration of the output Z1 is to be in action, the gate G3 is opened through g3. If the output z1 is reached, the gate G3 is in action and thereby controls the electronic relay ER. The start of the rectangular pulse is characterized through A. The amplitude of the rectangular pulse is determined by the voltage applied to ER through (A) (++), (+), (−), (−−). Then at the output of ER there are obtained rectangular pulses of predetermined duration and amplitude. If one wishes to have sine-like half-waves for transmission, the rectangular pulses are conducted to the lead through a low-pass filter TP, the transformer U and if necessary though a filter Fi.

Where only narrow bands at high frequencies are available it is of advantage to undertake the amplitude and/or phase changes of the characteristics in steps so that one only obtains very narrow frequency bands. For example, as illustrated in FIG. 7, if the normal phase or duration is 360 units and if this is shortened four times by 10 units, then with the 4th shortening there is a difference of 40 units as compared with 4×360 units. From f=1/T one then obtains the phase step frequency if one associates a predetermined time with the 360 units. If after the 4 abbreviated periods one changes back again to the normal period duration of 360 units then a running phase displacement of 40 units remains. This is more closely explained in European Patent Application number 0329158. On this basis one can undertake an advantageous coding in that for example 3 phase shifts (normal phase, phase advance and phase delay) and 3 different duration values are envisaged. Then simultaneously the phase jump steps are contained within the periods. If one takes 100, 150 and 200 as the duration figures and a 45 degree advance and 45 degree delay as the phase displacement, one has 9 coding steps. With 2 points one already has 9 to the power of 2 combinations and with 3 points 729 combinations. In this regard there are different variations in relation to number and phase. The alteration of a characteristic condition is indicated in the example by a change in amplitude. The amplitude can naturally also be provided in steps. With a phase jump of 45 degrees there results, in a 100 periods a phase change of 0.45 degrees for each period. As in a burst in television, in the receiving a reference phase is also necessary and here it can for example be the normal phase. With a channel band width of 64 KHz a smaller period number can be provided. The alteration of frequency is advantageously undertaken on passage through zero, also tolerances could both be permitted in the period number and also in the phase.

Where the amplitudes of two coded alternating currents with a phase displacement of 90 degrees are provided as the characteristics, one can also here undertake each change in characteristic by a number of amplitude steps. It is known that in the addition of such alternating currents in amplitude jumps, phase jumps also arise. In FIG. 2 such coded alternating currents ate illustrated with duo-binary coding. In FIG. 8 there is illustrated a vector diagram of such coded alternating currents with binary coding. The characteristics are Uk+U and Uk, Vk+V and Vk. On alteration of the amplitude, phase jumps of q can arise. In order to avoid these, the changes in amplitude are carried out in steps, illustrated in the figure at Stu and Stv. FIG. 9 illustrates a circuit for generating such steps. In the example the alteration is achieved by means of resistors R1, R2, ... which are introduced into the alternating current circuit by means of an electronic replay eS. The control takes place in this arrangement during the passage through zero in that by means of a limiter B synchronizing pulses are generated, by which the coder, which switches the electronic relay, is controlled.

For transmission one can also combine several lines together and transmit them in code multiplex. One could then also distribute the EOL and other marks on the combined lines. The code-multiplex combination can for example take place in that the symbols of the individual lines are binary-coded, synchronized and combined in parallel and combined with a multi-value code word. Six lines are combined together in accordance with this method in FIG. 10. The code word S1 is then made up of the binary code elements 100100, S2 of 001000, S3 of 100011, and so on. The start and stop and also if necessary other codes can be spread over all the lines. Examples of this are illustrated in FIGS. 11 and 12. These characteristic marks can be identified by one or several parallel code words. In FIG. 11 there are 4×6 binary code elements. In FIG. 12 4 lines are combined together, 4×4 code elements being provided for the start and stop marks. One can also assign a special code to the last line. A further reduction of the transmission time can be achieved in that lines of the same code length or similar code length can be combined by code-multiplexing with the interposition of a store, a line mark being necessary for each line. With DIN A4 documents there are eg. 1100 lines. Therefore 1100 combinations must be provided for the line coding. These could however at the same time also be used as the EOL marks. The code-multiplex combination of the symbols of numbers is achieved advantageously with a high-value, eg. quaternary or octonary coding. In FIG. 13 there is illustrated an example of a quaternary coding. Eight bits are necessary for coding 256 combinations, and these can be represented using eight binary code elements. One can also bring together the eight code elements into 4 dibits, so that only 4 code elements are necessary for coding the 8 bits. In the example of a symbol coding for 10 white, 10 black, for the thousands and other symbols 32 combinations, that is to say 5 bits, are necessary. With quaternary coding one will always combine 2 symbols in series or parallel, so that dibits can always be formed. With a 4-stage coding one then obtains, with 5 positions, 4 to the power of 5, that is to say 1024 combinations, and therefore 10 bits. If binary half-wave code elements are provided in FIG. 2, 5 half-waves are necessary respectively with the 2 coded alternating currents. All the lines having only white can have their own short code. One can also insert in advance the code word for the white lines and in the subsequent part then only raise the line numbers of the white lines and give a special mark again at the end of the white lines. This method of transmitting the white lines can be employed in all known coding and transmission methods. Of course white lines do not need to be printed so that one only needs to provide one further circuit at the receiver. Such electronic circuits are known from circuits of electronic typewriters and need not be further discussed.

In the transmission of documents and images it is sometimes also necessary to code and transmit gray values. In one known code in this field the different gray steps are illustrated solely by white and black pixels. In such an arrangement resource is had to the Dither method already known in printing technology. In this the gray steps are converted into more or less dense patterns of white and black pixels. The scanning unit evaluates correspondingly the analogue voltage values which are received from the reflecting surface are the gray steps, eg. 16, and stores them. A white surface corresponds to the gray value 0 and a black surface to the gray value 16. Coding and transmission can again be achieved on the principle of run length, one can also code the steps, eg. 1, 2, ... 16 and transmit them or also the respective analogue value.

To reduce the transmission time 2 or 3 gray steps can be combined to form a code word. The respective gray value can also be transmitted in analogue form, in that the voltage values or pulses which indeed correspond to PAM pulses can be converted into pulse lengths and with the aid of an electronic relay into rectangular pulses. The length of the respective rectangular pulse then corresponds to the height of the observed voltage value. One can then produce a coded alternating current through a filter. The half cycle duration or cycle duration of the half waves then contains the information. This principle is already disclosed in European Patent Application Publication Number 0 329 158.

For the coding and transmission of colored images and documents, eg. for facsimile and color television, expensive methods have hitherto been employed. In facsimile (telefax) it is advantageous to transmit the color components of the primary colors because in many cases the paper at the receiver comprises 3 super imposed photo layers. Color television coding methods are known from the NTSC-PAL- and SECAM systems and from my U.S. Pat. No. 4,675,721 and German Patent Applications P3 223 312, P3 226 382 and P3 709 451. In the present method the transmission of all the color information signals takes place using only one carrier or however the carrier is provided directly for information coding.

Where one codes and transmits only the color components, gray values are to be transmitted for the green, red and blue. In facsimile in such an arrangement a smaller number of steps (with digital coding) than in television is sufficient. For example, with 16 gray values for each color one can therefore combine respectively the 3 values of the primary colors by code-multiplexing. For this 12 bits are necessary and they can be coded with the code already used, such as for example with the half-wave code of FIG. 2 or with a phase code in combination with a period number of amplitude steps. Also the narrow band coding can be provided if for example one considers phase steps and/or amplitude steps and/or steps in the number of, for example, periods.

One can naturally also use these codings when one transmits the color difference signals and the luminance signal, if necessary also code-multiplex. Where the code-multiplexed information is to be transmitted by radio, eg. for television purposes, where the high frequency transmitter is simply modulated with the coded alternating current. The receiver is then constructed like a supernet radio receiver and one such is illustrated in FIG. 14. Only a further decoder DC is necessary after the demodulator DM. More is revealed by European Patent Application Publication Number 0 329 158.

In the television systems used up to now for example the color signals R-Y and B-Y are respectively modulated onto a respective carrier of the same frequency with a phase displacement of 90 degrees. According to the polarity of the respective color voltage the carrier has made corresponding jumps in phase. Both carriers are added together for transmission. The sum vector which represents saturation of the colors determines the color by its angle in the color circle. In FIG. 15 analogue signals are shown by R-Y and B-Y and FIG. 16 shows a corresponding vector diagram. A drawback of such transmission is that the small values are adversely affected by distortion. By means of a DC bias voltage, indicated in dotted lines in FIG. 15, one can make the voltage values solely positive, so as to produce a vector diagram as illustrated in FIG. 17 on addition of the carriers. As in PAM it is of advantage to scan the color signals and construct them as staircase signals. If the luminance signal is scanned likewise in synchronism with the color signals, the color signals being scanned alternately and alternating current carriers which are mutually displaced by 90 degrees modulated onto the signal, then on an addition of the carriers with an alternating current one can transmit the whole FBAS signal, then on an addition of the carriers with an alternating current one can transmit the whole FBAS signal. In FIG. 18 is illustrated the step-shaped PAM signal and in FIG. 19 a corresponding vector diagram. With DC bias on all PAM pulses then with vector changes a phase jump of 90 degrees can never arise as also follows from FIG. 8. Using intermediate storage one can mix the pulses so that one color pulse comes on 3 or 4 luminance pulses. With this kind of coding the information is representing by the magnitudes of the sum vectors and by their phase position. If a narrow frequency band is necessary for transmission, one can consider using the method of FIG. 8.

Figure 20:
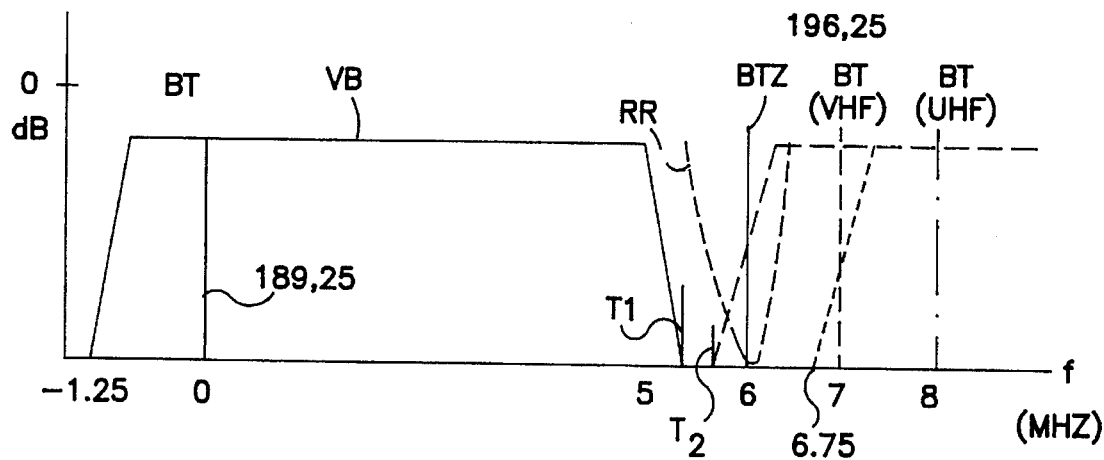
FIGS. 20, 21 a narrow-band information channel between TV channels.
Figure 21:
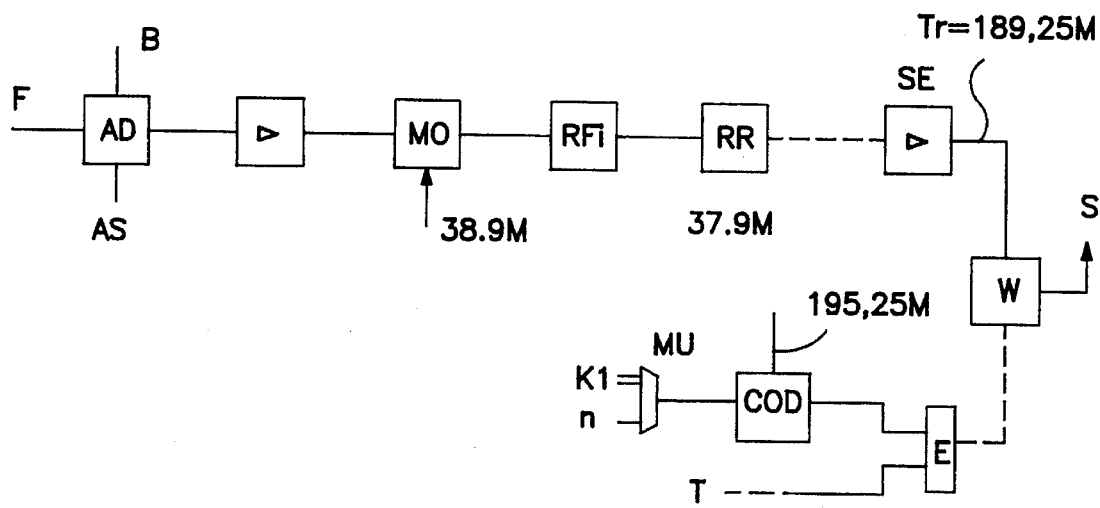
Figure 22A:
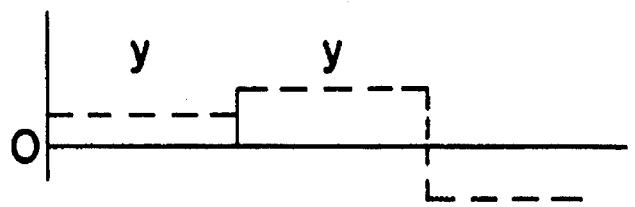
Figure 22B:
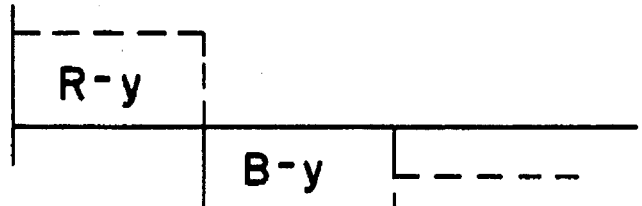
Figure 22C:
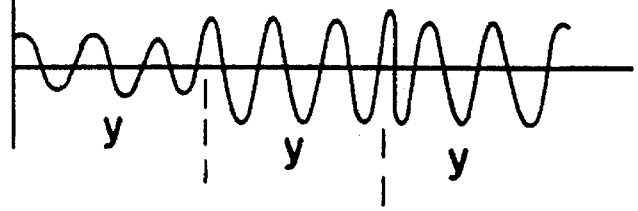
Figure 22D:
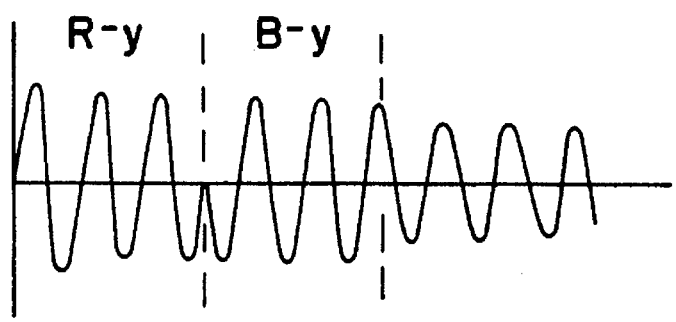
Figure 22E:
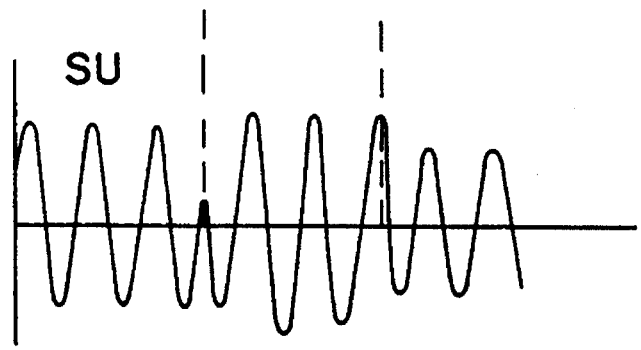

Telefax can also be introduced into television for particular professional groups, eg. for lawyers in order to receive new parts of basic law, for tax advisers, for doctors and so on. This could for example be achieved in the way that one uses the second sound channel for this purpose. The LF output of this channel must be connected to sockets so that at any time the telefax apparatus could be connected to it. Such a connection could also be made available only on payment of a fee. The sound carrier could simultaneously be coded in a narrow-band form as an information carrier. Naturally one could also use the other known frequency and time multiplex methods for the second channel for telefax. Using the sound carrier so much can be coded that one can still code other information as well as the second sound channel. For example if 100 periods are provided per code element, then with a sound carrier of 5742 MHz one can make 57420 code elements. One can also introduce an additional channel between the television channels, in that between sound channel 2 and the following television channel one provides a carrier which is employed simultaneously for narrow band phases and/or amplitudes and/or different numbers of periods. By a corresponding series resonance circuit one can, as shown in FIG. 20, make available the band width for such a carrier. In the drawings the series resonance curve is indicated at RR and the carrier at BTZ. IN FIG. 21 is illustrated the principle of the arrangement of a narrow-band channel between 2 television channels. The carrier frequency would be around 195.25 MHz. Small frequency variations are always available by the step-wise changes in phase and amplitude. This principle is already more closely described in German Published Specification 4025026.

In FIG. 22 there is illustrated a method in which the analogue or digital information can be transmitted on two channels with only one alternating current. In the example it is the luminance signal Y and the color difference signals R-Y and B-Y. The Y signal and the two color information signals are alternately pulse-amplitude modulated and formed into step signals, which is certainly already known. This is illustrated in FIGS. 22a and 22b. Both the signal sequences are modulated onto a respective carrier alternating current of the same frequency, which however are phase-displaced through 90 degrees. The carrier frequency in the example of FIG. 22d is advantageously synchronized with the pick-off frequency and is an integral multiple of the pick-off frequency. The two carrier alternating currents FIGS. 22c and 22d, are added in sequence. This results in a sum alternating frequency Su of FIG. 22a of the same frequency as the two carriers. On the modulation of the step signals onto the respective carrier alternating currents and also in the addition of the two carriers jumps in phase arise. These jumps in phase of the sum alternating current contain in conjunction with the respective amplitudes the information of the step signals of FIGS. 22a and 22b. This sum alternating current can naturally be transmitted in this form to the receiver. In the evaluation of the phase position a reference current like the burst is necessary. Such evaluation is for example known from the PAL system.

With the customary methods, during color image transmission the 3 orders of the base color separations for green, red and blue or the luminance signal Y and the color type signals, such as the color difference signals R-Y and B-Y are transmitted, for example. In many cases, quadrature amplification modulation is provided for the transmission. This can take place by means of direct transmission of the coded signals, in that the amplitudes of half-waves or periods are used, which are distributed on two alternating currents of the same frequency, phase-shifted by 90°. For transmission, the two alternating currents are added together. In case of indirect transmission, for example, the PAM-modulated signals are coded by means of the amplitudes of rectangular pulses, staircase signals, or by the amplitudes of half-waves or periods of alternating currents and are respectively lined up into two uninterrupted sequences and modulated onto two alternating carrier currents, phase-shifted by 90°. These are then added together for transmission. Since 3 values must always be transmitted during color image coding, such as the base color separations for green, red and blue or the luminance signal Y and the color type signals, such as the color difference signals R-Y and B-Y, a cyclic interchange is required, taking into consideration the weights, which looks like this, for example: base color separations gr/rt, rt/bl, bl/gr, gr/rt, ... luminance signal and color difference signals Y/R-Y, Y/B-Y, Y/R-Y, .... In this case, with the base color separations an equal weight is used, and with the luminance signal and the color difference signals a weight of 2.1.

The coding or sum alternating currents can simultaneously be provided as transmission alternating currents. If direct current biases are provided with the PAM pick-ups, they are made of such strength that the useful signals lie above the noise or interference level.

Based on the requirements, it is possible to use the same code words for white ws and black sw for the run lengths. Each line must always start with a white run length. If the line starts with the color black, the white run length zero is transmitted first. In addition, the code word EOL is transmitted at the start of each page and the end of each line. With this, the synchronization of the white/black sequence is also fixed, which is of particular importance during evaluation. The frequency of the appearance of lengths was taken into account during number coding. If it is intended to transmit written material, short run lengths, such as 2, 3, 4 often appear with black. Correspondingly small code words, such as 11, 10, 011 were assigned to these. As a consequence, frequency will be taken into consideration when using the same code words for white and black. In accordance with the present table, the numbers 2 to 7 occur with the same frequency with white, while with black 2 and 3 occur most frequently. Thus, in accordance with the invention, with black the shortest code words are used for the numbers 2 and 3, these are used with white for the number 4 and 5, for example. Half of the codings are then no longer required. Coding of the larger numbers will no longer be provided with black, because they have twelve digits, while they have only eight digits with white. In case of a greater horizontal resolution, a corresponding frequency adaptation will of course be made. If a change from eight to sixteen pixels per millimeter is made, 2sw is increased to 4sw pixels, i.e. the number 4 than occurs most frequently with black. The coding possibilities for some of the most frequently occurring numbers are shown below.

| wsL | wsC | swL | swC | Horizontal Resolution, for example 16 | | | |
|---|---|---|---|---|---|---|---|
| | | | | wsL | wsC | swL | swC |
| 0 | 00110101 | | | | | | |
| 1 | 000111 | 0 | 00110101 | | | | |
| 2 | 010 | 1 | 010 | 5 | 010 | 3 | 010 |
| 3 | 11 | 2 | 11 | 6 | 11 | 4 | 11 |
| 4 | 10 | 3 | 10 | 7 | 10 | 5 | 10 |
| 5 | 011 | 4 | 011 | 8 | 011 | 6 | 011 |
| 6 | 0011 | 5 | 0011 | 9 | 0011 | 7 | 0011 |
| 7 | 0010 | 6 | 0010 | 10 | 0010 | 8 | 0010 |
| 8 | 0111 | 7 | 0111 | 11 | 0111 | 9 | 0111 |
| 9 | 1000 | 8 | 1000 | 12 | 1000 | 10 | 1000 |

Figure 23:
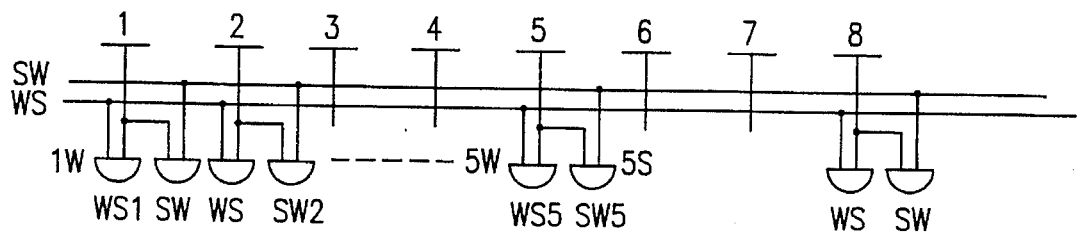
FIGS. 23, 24, 25 a rearrangement of code words.
Figure 24:
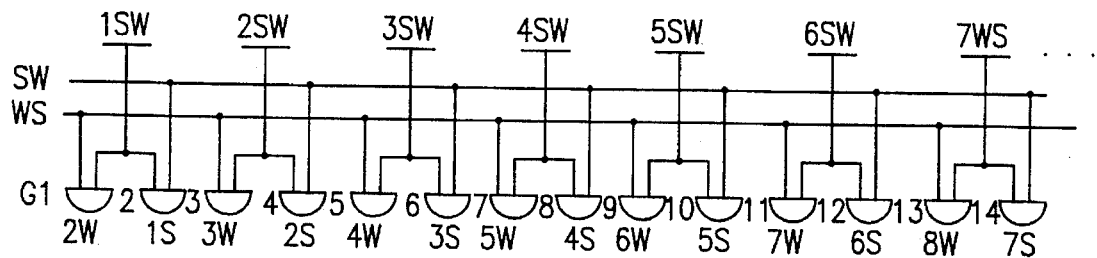
Figure 25:
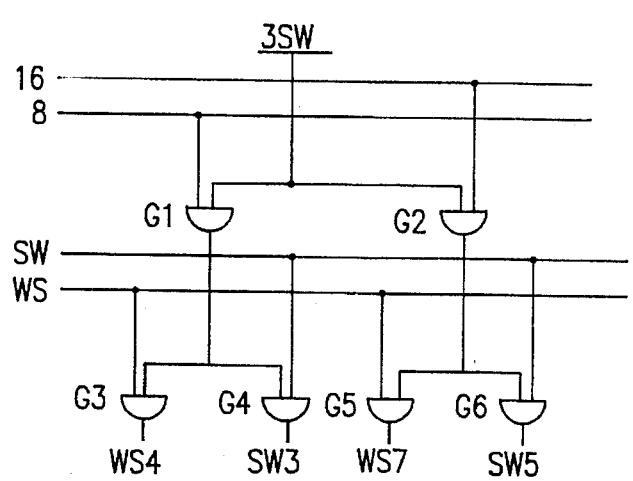

On the transmitting and receiving end it is only necessary to wire the coding and evaluation device appropriately for obtaining the desired codings or run lengths. Some circuits for the assignment of the code words to the predetermined run lengths are shown in FIGS. 23, 24 and 25. A white run length or a zero always follows after the evaluation of the EOL mark. By means of a circuit, which is known, the sequence white/black is switched on after the evaluation of the EOL mark and a corresponding potential, for example high h, is applied to ws/sw. If in FIG. 3 the number 1 was evaluated and the sequence happens to be white ws, 1w h/h is present at the gate, so that it becomes active and marks the number white ws1. If the number 5 was evaluated and the sequence happens to be black sw, the gate 5s is twice hh, so that the number is marked black sw5.

A circuit for the assignment of the evaluated code words for different numbers for white and black in accordance with the left side of the table is shown in FIG. 24. In this case the code words sw 1 to 6 are also provided for the numbers 2 to 7. If, for example, the code word is 1sw and the sequence is marked white ws, the gate G1 becomes active and the number 2 white is marked 2w. If the code word 5sw is evaluated and the sequence is marked white ws, the gate 10 becomes active and the number is marked black 5s. If the code word white 2ws is marked and the sequence is marked black sw, the gate 14 becomes active and the number 7 is marked black 7s.

An example is shown in FIG. 25, wherein switching to various run length numbers as a function of the respective resolution of 8 or 16 pixels per millimeter takes place. It is of course possible that such switching takes place by means of an individual chip. In the table, examples are shown for the assignment for 8 pixels to the left and 16 mm to the right. If, for example, the resolution is 8, a potential h is applied to 8 in the receiver. If in this case the code word 3sw is evaluated, the gate G4 becomes active and applies such a potential to G3 and G4, that with a white marking ws G3 becomes active and with a black sequence marking G4 becomes active and marks the numbers white ws4 or black sw3. If subsequently after G1 another potential is required, it is possible to switch a potential reversing gate downstream of G1, for example a NOT-gate. If the resolution 16 is marked, G2 becomes active and subsequently, as a function of ws or sw, the gate G5 or G6. Thus, the number ws7 or sw5 (see the Table) is marked.

Figure 26:
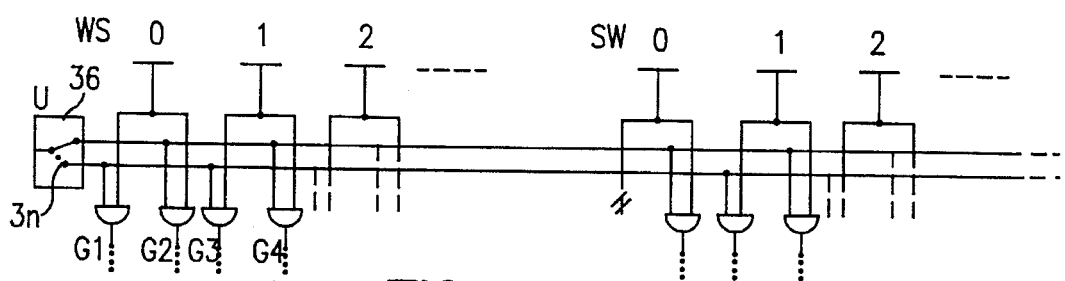

In actual use, the new coding in connection with group 3 will be applied in the transition state by providing a switch-over to the new coding. The code words not used would then not become effective. It would of course also be possible to retrofit devices already on hand with the help of add-on units. A possible principle of a switch-over is shown in FIG. 26. The outputs of ws 0, 1, 2, . . . and sw 0, 1, 2, . . . are respectively connected to two gates. These gates only become active as a function of a potential which is respectively applied to one of the two gates via the reversing switch U. If coding of the group 3 is intended, the switch is in the position 3b, if the new coding is to be used, the switch U is in the position 3n. If, for example, white 1 is marked and the switch U is at 3b, the gate G4 is connected to the potential one time via ws1and another via U/3b, so that the coding of the group 3 becomes active. If, however, the switch is at U/3n, then there is a potential on both inputs of the gate G3, so that it can then become active. As can be seen from FIGS. 23 to 25, the coding ws 1 can be assigned to arbitrary numbers. If, for example, the coding sw0 is not needed, no gate is connected to it for the new mode of operation. This is only one example of switching.

Figure 27:
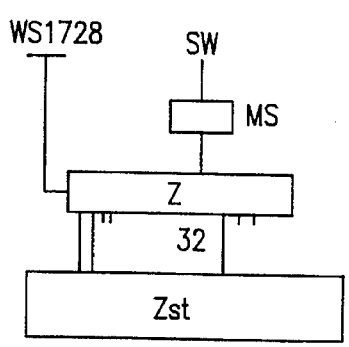
FIGS. 27, 28, 33 coding and decoding of unchanging running lengths.
Figure 28:
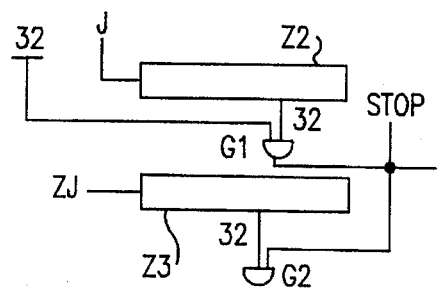
Figure 29A:
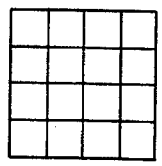
FIGS. 29, 30, 31, 32 coding of gray tones.
Figure 29C:
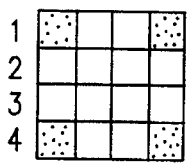
Figure 29B:
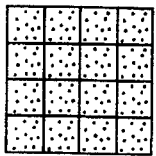
Figure 29D:
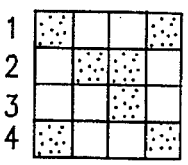

A further reduction of the transmission time can be attained in that during coding of only white or black lines the code word for white or black is provided only once, and subsequently the code word for the number of the respective lines, such as the code word for 1728 white, and following that the number of the white lines, for example 83. With typewritten pages there is normally a white distance of 4 mm between the lines. This would result in thirty-two lines with a resolution of 8. Since white lines occur very often, it would be possible, for example, to provide a short code word for 1728. It is of course advantageous if the written line has the same horizontal position as the inserted page. The collection of the number of white lines can take place for example in such a way, that a counter is controlled by means of the white line code word until a code word for black sw appears. The output which is then marked at the counter is evaluated in the central control, coded and either stored or immediately sent via modem to the transmission path. In FIG. 27, the coding white line ws1728 is switched to the counter Z, so that the counter is advanced with every coding by one output. The counter itself is connected with its outputs to the central control unit ZSt. The black code words sw are connected via a monostable switch, which is delayed in activation. Such a connection is also provided directly to the central control ZSt. The counter level is now immediately determined, stored, if required, and coded. The counter is returned into the initial position via sw, MS. Via the transmission path, the central control provides the receiver with the code word for white lines and subsequently the number of white lines via the coder, the modem and the switch-on unit. Upon receipt of the code word "white line" on the receiver side, the output corresponding to the number of white lines is marked on a counting device. The recording unit is then controlled from the central control, with white lines an immediate continuous switching then takes place until the number of the stored spaces has been switched. A principle of the comparison between the stored number of white lines and the switched white number is shown in FIG. 28. As soon as white lines are marked, the counter Z2 is started via J. Thirty-two lines are marked in the example. Therefore a connection has been made to a gate G1, to which the thirty-second output of the counting member is connected via another input. As soon as the counting member Z2 has reached the output thirty-two, the continued switching of the counting member is interrupted via stop by means of the potential now appearing at the output of G1. The counting member Z3 is also controlled via the recording unit with the switching of the white lines via ZJ. When the output thirty-two is reached at the counting member 22, the gate G2 becomes active, by means of this further switching of the white lines is stopped.

Figure 31:
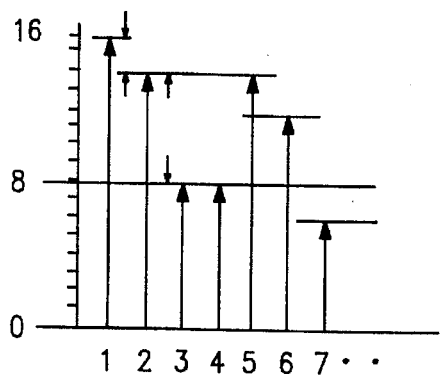
Figure 32:
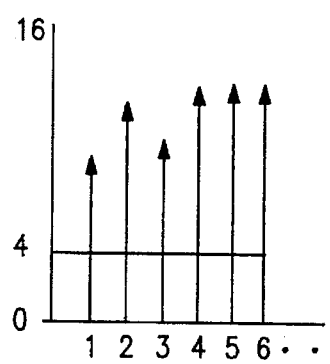

During transmission of gray, the principle of using the same code words for white and black does result in considerable time savings. However, they are not yet satisfactory. Below further possibilities of gray coding and transmission are revealed. Up to now and as shown in FIG. 29, it was the custom for coding the gray shadings also with only white and black pixels to change the halftones into more or less dense patterns of black and white pixels. In this case the scanning unit evaluates the analogous voltage values. The step 0 is assigned to the white pixel in this case and to the black one the step 16 or, with a better resolution, the step 64. The steps are then changed into corresponding patterns, some of which are shown in FIGS. 29a–d. In this manner it is then possible to process the information further as a black or white pixel. From this it becomes clear that there are always short run lengths to be transmitted, so that transmission becomes very time-consuming. In the following exemplary embodiments ways are shown how it is possible to achieve a shortening of the transmission time of the gray image transmission. A plurality of pixel voltages are shown in FIG. 31. 1 is black and corresponds to 16 steps, 2=14, 3=8 steps, etc. White and black occur very seldom in a gray image, so that the steps located at white and, if necessary also those at black, are separately coded and transmitted.— The transformation of the pixel steps in accordance with the Dither process takes place only in the receiver.—Thus, first the first four steps are coded and transmitted line-by-line, as shown in FIG. 32, and then the remaining steps. The code used in group 3, for example, will be used as the code. In FIG. 4, for example, there are no values under 4 up to the pixel voltage 6. Thus, the value 4 would be assigned sw2=11, for example. As already described in connection with a further characteristic of the invention, since 4 appears six times in a row, a coded number 6 will be provided after the code word for 4, for example, if 4 occurs 96 times in a row, the coded number for 96 following the code word for 4. It is possible in this way to transmit a large amount of line information already. The same can be provided for the steps 13, 14, 15 and 16. With gray images the main information will lie between the steps 5 and 13. It is of course possible in the same way to transmit the difference of the steps in relation to the end step 16. It is easily possible to provide individual microprocessors for the traffic between large companies or offices, which then calculate the respectively most time-saving transmission coding. Intermediate storage is always practical.

Figure 30:
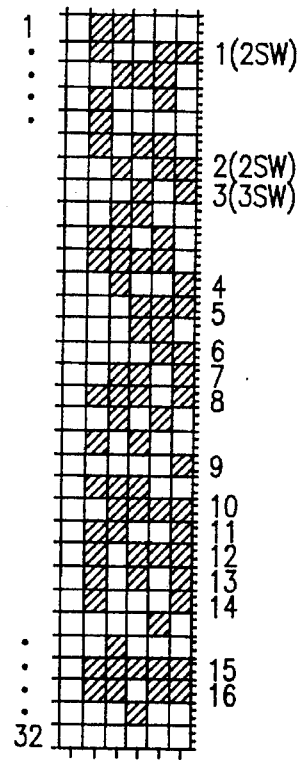

A further possibility of shortened transmission is to code the 16 steps, as with teletype operations, and to transmit them in this way. With a binary code, two to the fourth power code elements would be required. It would be of course possible to use the run length coding of the group 3 as well. With sequentially appearing similar code words it would again be possible to send the number of the sequential code words to the receiver by means of a number. With this method it is possible to reduce the transmission time once again. This effect can be increased if a redundancy is purposely introduced into the code, for example by providing a 5-digit binary code for the 16 steps. An example of this is shown in FIG. 30. 32 combinations are possible with these five digits, the same as in the teletype code No. 2, indicated by I-32 in FIG. 30. The five code elements are then transmitted in two lines, once with two and another time with three respectively combined. In FIG. 30, the code elements of columns 4 and 5 are provided for the one line, and the code elements of lines 1, 2 and 3 for the other. In the example it is intended to use the code words which are started with black in column 5 for the coding of the 16 steps. Thus, only the code elements black/black and black/white are always used. It is then possible to provide the shortest code of the group 3 for them, namely 2sw and 3sw. Sequences of the one or the other coding very often appear in these two codings, so that the effect of coding and transmitting the number of sequences often occurs. The 3-digit code words of columns 1, 2 and 3 appear respectively three times, so that eight code words must be provided for the three columns. If the columns 3, 4 and 5 and 1, 2 are respectively combined in one line, then only four code words are required per line.

In FIG. 31 it is also possible to provide a two-line transmission and to use the 8 as initial line. In this case the values 0, 0, 0, 0, 0, 0, 2 would occur for the pixels 1, 2, . . . 7 against 0, and the values 8, 6, 0, 0, 6, 4, 0 against 16.

It is also possible, respectively analogous to FIG. 17, to transmit the values 8 to 0 and 8–16, or two pixels simultaneously. In this case R-Y would be assigned to the pixels 1, 3, 5, . . . and B-Y to the pixels 2, 4, . . . It would also be possible to transmit 2×QAM simultaneously, if one is associated with the upper sideband and the other with the lower sideband of a carrier and respectively filter out one of the two by means of filters and combine the bands not filtered out. Such a principle has been disclosed in U.S. Pat. No. 2,907,830, for example. It is of course possible to apply this principle also to the transmission of color TV signals.

Figure 33:
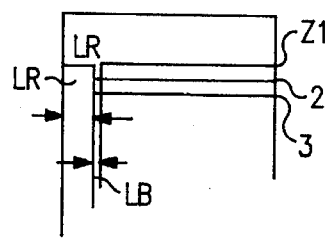

If a large amount of written text with large left margins must be transmitted, it is possible to divide these into a fixed edge, indicated by LR in FIG. 33, and a differing letter-start edge LB. It is then only necessary to transmit the fixed edge once, and the edge LB is then transmitted every time. Such an edge coding can be made manually or can be automatically determined by means of a microprocessor.

I claim:

1. Data-reducing coding method for transmitting information from a transmitter to a receiver, comprising the steps of:

sampling the analog information (PAM) with predetermined sampling frequency;

quantifying the sampling values;

storing the quantified sampling values in memory;

determining an optimal reference level for a sequence of quantified sampling values, for sections of a line, of plural lines, of a block, of plural blocks;

coding the reference level and the quantified sampling values on the basis of the determined reference level;

coding subsequently occurring equal values in the sequence of quantified sampling values, in the sections of a line, of plural lines, of a block, of plural blocks such that the coded number of subsequently occurring equal values is provided in combination with said equal value;

transmitting the coded reference level, the coded values and a predetermined code to the receiver; and evaluating the transmitted values on the basis of the transmitted reference level and of the transmitted predetermined code at the receiver.

2. Coding method in accordance with claim 1, characterized in that numbers are coded digit-by-digit (e.g. 28 by code word 2 and by code word 8).

3. Coding method in accordance with claim 1, characterized in that the coding method is used with telefax, digital speech transmission and/or television.

4. Coding method in accordance with claim 1, characterized in that for telefax the gray tones are transformed at the receiver in accordance with the Dither process.

5. Coding method in accordance with claim 1, characterized in that the reference level is determined either by a maximum level value or by a minimum level value for the sequence of quantified sampling values, for the sections of a line, of plural lines, of a block, of plural blocks.

6. Coding method in accordance with claim 1, characterized in that color separations of base colors are coded and transmitted for colored image patterns for telefax and television.

7. Coding method in accordance with claim 1, characterized in that a digital amplitude/phase code with reference phase relation and with leading or lagging phase relations is provided as a code for transmitting the quantified sampling values on the basis of the determined reference level.

* * * * *